Oct. 31, 1939.   H. ST. PIERRE   2,177,753
CHAIN LINK
Filed Nov. 7, 1938
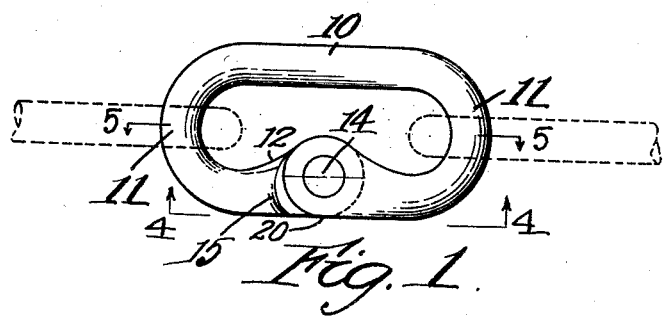
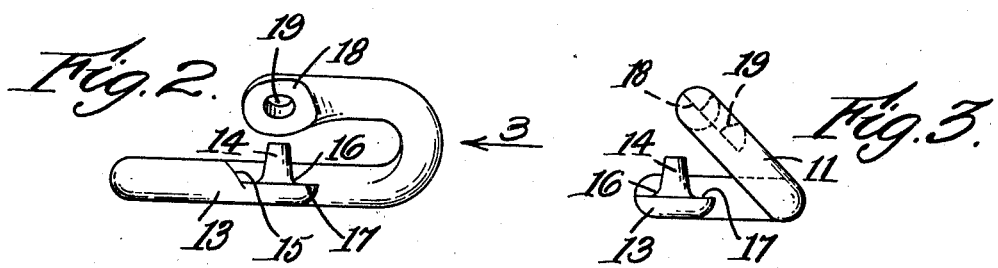
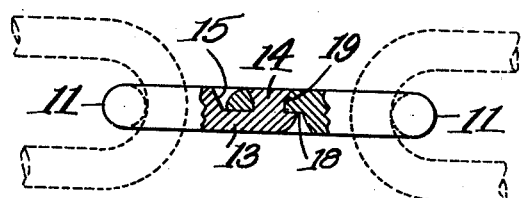
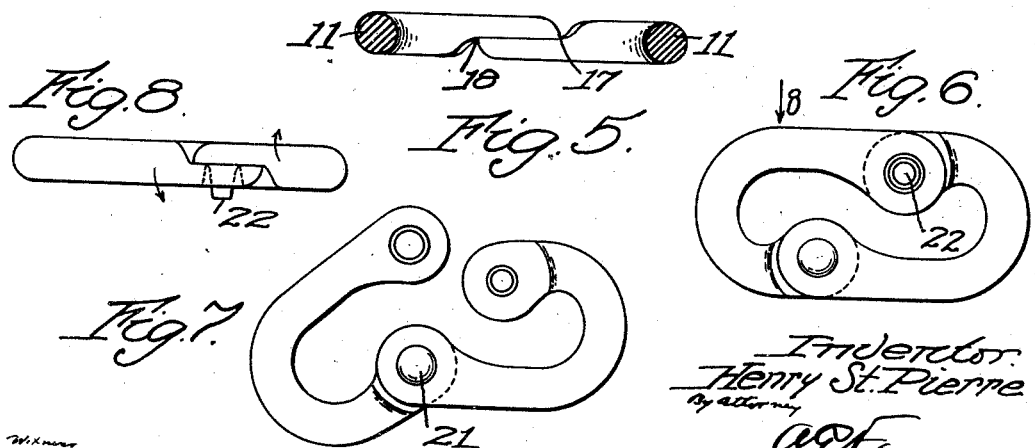
Inventor
Henry St. Pierre
By attorney Patented Oct. 31, 1939

2,177,753

UNITED STATES PATENT OFFICE 2,177,753

CHAIN LINK

Henry St. Pierre, Worcester, Mass.

Application November 7, 1938, Serial No. 239,225

1 Claim. (Cl. 59—90)

This invention relates to a chain link adapted particularly for side chains but capable of general use.

The principal objects of the invention are to provide such a chain link with an open portion which can be closed to connect two other links together by a very simple means and form a structure even stronger than an ordinary continuous link; to provide a link which is capable of being used for a repair link or for the entire chain or even for a chain in which these links form each alternate link of the chain, and to provide a link of this character in which, in full position, the outside of the link will not be distorted and will not project beyond the ordinary outline of such a link, so that it can be used on a pulley or chain fall, as is the case with ordinary types of links.

Other objects of the invention are to provide a first-class chain without welding, but simply forging, thus reducing the expense of attaching the ends of a chain link to each other, and to provide such a replaceable chain link of metals or alloys which do not weld commerically and which will stand heat treatment to provide greater strength, such as stainless steel or resist corrosion from acids, salt water, and the like, such as brass.

Other objects and advantages of the invention will appear hereinafter.

Reference is to be had to the accompanying drawing, in which:

Fig. 1 is a plan of a link constructed in accordance with this invention and in full closed position;

Fig. 2 is a side view of the link before the ends are connected together;

Fig. 3 is an end view, taken in the direction of the arrow 3 in Fig. 2, of the same link and in the same position;

Fig. 4 is a central view on the line 4—4 of Fig. 1, showing the ends of the chain link, whether used as a repair link or not, forged together;

Fig. 5 is a sectional view on the line 5—5 of Fig. 1;

Fig. 6 is a plan of a link of modified construction coming within the scope of this invention;

Fig. 7 is a similar view with the link open to be received by a closed link, and Fig. 8 is a side elevation of this link.

This invention relates to a chain link having two ends normally separated so that it can be used for a repair link, or for any other purpose desired, by inserting another link, either like it or an ordinary link, into the space between the ends and then merely forging the ends together so that they come out in the form shown in Fig. 4. Such a repair link may be even stronger than an ordinary link of the same size.

Such a link is formed, in accordance with this invention, with a side element 10 and two half round ends 11 in the same plane. The other side is formed in part of a member 13 in the plane of the side 10 and with a transverse stud 14 projecting up from it in the center at its end. The wall 15 between the stud 14 and the main surface of the part 13 is a slanting surface. The top surface 16 all around the stud is rounded around the stud and otherwise forms a perfectly flat surface 17, surrounding the stud. The entire link is made, as usual, of the same thickness or diameter, except where it is flattened out at the joint and the extra metal is provided at 12 in the form of a gentle curve for strength.

Forming the rest of this side is an opposite flat surface 18 which will fit on the flat surface 17 and a perforation 19 for receiving the stud 14. As will appear, the stud 14 is changed in shape as shown in Fig. 4 by forging when the two ends just described are brought into the same plane, as shown in Fig. 4. This stud is distorted in shape by providing it with enough metal so that it can be hammered out to fill the opening 19 which is curved out so that it is larger in diameter on the outside than it is at the center of the link.

This locks the stud in position and makes the repair link or new link, as desired, actually stronger than the ordinary link having both sides the same. Also, it will be seen, in Fig. 1, that the outer surface 20, where the two parts of the link are joined together, is in a straight line like the side 10 and therefore the link is capable of use on pulleys or falls or the like.

In the form of this invention shown in Figs. 6, 7 and 8 the link is in two parts, pivoted together by a pivot stud 21. The shape around this stud is practically the same as at the fastening stud 22. In fact the pivoting feature is practically the only difference between the two forms. This avoids bending the link, for putting it in place, because the joint at 21 is loose when the link is assembled.

Such a link makes a strong chain. It can be heat-treated and can be used for repairs in most simple manner. All that has to be done is to place the chain link in place, in connection with either one or two ordinary links, and hammer it, no welding having to be employed. If greater strength is required, it can be made of stainless steel or brass, even if the same does not weld commercially.

Having thus described my invention and the advantages thereof, I do not wish to be limited to the details herein disclosed, otherwise than as set forth in the claim, but what I claim is:

As an article of manufacture, a chain link comprising a straight side and two oppositely curved ends projecting therefrom, and extending towards each other, said ends being normally in separated relationship, one end having a circular flat surface sunk below the surface of the link, a stud projecting upwardly from the center of said sunken surface and extending just slightly above the surface of the link, said stud being of tapered outline and surrounded by the sunken surface which is considerably wider than the diameter of the link, and extends wholly within the confines of the link, a rib extending from the innermost point of the sunken surface to the curved portion of the corresponding end of the link, the other end having a sunken flat surface correspondingly opposite to the first sunken surface to mate therewith when the ends are twisted together, and a perforation therethrough for receiving the stud, a rib extending from the innermost point of the second sunken surface to the curved portion of the corresponding end of the link, the link being completed by forging the stud into said perforation, whereby the side of the link having the connection is smooth and straight and has no projections except within the confines of the link.

HENRY ST. PIERRE.